United States Patent
Engels et al.

(10) Patent No.: US 11,001,296 B2
(45) Date of Patent: May 11, 2021

(54) MOTOR VEHICLE STEERING SYSTEM

(71) Applicant: Ford Global Technologies, LLC, Dearborn, MI (US)

(72) Inventors: Frank Peter Engels, Solingen (DE); Florian Rath, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 16/282,057

(22) Filed: Feb. 21, 2019

(65) Prior Publication Data

US 2019/0256127 A1 Aug. 22, 2019

(30) Foreign Application Priority Data

Feb. 21, 2018 (DE) .......................... 102018202611.4

(51) Int. Cl.
*B62D 5/00* (2006.01)
*B62D 5/04* (2006.01)

(52) U.S. Cl.
CPC ........... *B62D 5/0463* (2013.01); *B62D 5/003* (2013.01); *B62D 5/005* (2013.01); *B62D 5/0484* (2013.01)

(58) Field of Classification Search
CPC ........ B62D 5/001; B62D 5/003; B62D 5/005; B62D 5/04; B62D 5/043; B62D 5/0463; B62D 5/0481; B62D 5/0484; B62D 5/049

USPC ................................ 180/402, 405, 407, 443
See application file for complete search history.

(56) References Cited

U.S. PATENT DOCUMENTS

| | | | |
|---|---|---|---|
| 8,297,401 B1 | 10/2012 | Schneider et al. | |
| 9,845,106 B2* | 12/2017 | Bodtker | B62D 1/16 |
| 2005/0155809 A1 | 7/2005 | Krzesicki et al. | |
| 2015/0298722 A1 | 10/2015 | Witte | |
| 2017/0057541 A1 | 3/2017 | Bodtker et al. | |
| 2018/0170427 A1* | 6/2018 | Visscher | B62D 5/0463 |

FOREIGN PATENT DOCUMENTS

| | | |
|---|---|---|
| DE | 19902556 A1 | 2/2000 |
| DE | 10310505 A1 | 9/2004 |
| DE | 10316599 A1 | 11/2004 |
| WO | WO2017060042 A1 | 4/2017 |

* cited by examiner

*Primary Examiner* — Ruth Ilan
*Assistant Examiner* — Hosam Shabara
(74) *Attorney, Agent, or Firm* — Raymond L. Coppiellie; Burgess Law Office, PLLC

(57) ABSTRACT

A motor vehicle including a steering mechanism, a steering gear mechanically decoupled from the steering mechanism, a drive unit for driving the steering gear, and a transmission unit connecting the drive unit in a torque-transmitting manner to the steering gear. The transmission unit including a first torque transmission path and a second torque transmission path wherein the transmission unit has a redundancy.

7 Claims, 2 Drawing Sheets

MOTOR VEHICLE STEERING SYSTEM

CROSS-REFERENCE TO RELATED APPLICATIONS

Not Applicable.

BACKGROUND OF THE INVENTION

1. Field of the Invention

The present invention generally relates to a motor vehicle steering system; and more specifically to a steering mechanism for the vehicle.

2. Description of Related Art

Motor vehicles include steering systems that have mechanically decoupled steering, often called steer by wire. Such systems may include redundancy in the event of steering loss, including several actuators providing an assist torque to a steering gear, for example, servomotors.

SUMMARY OF THE INVENTION

A motor vehicle steering system including a steering gear mechanically decoupled from a steering mechanism, a drive unit driving the steering gear, and a transmission unit connecting the drive unit in a torque-transmitting manner to the steering gear, the transmission unit including a first transmission path and a second transmission path. The first transmission path includes a belt drive. The second transmission path is a gear drive, including a connecting wheel. A decoupling of the second transmission path occurs when there is a tension in a belt of the belt drive of the first transmission path.

Further areas of applicability of the present invention will become apparent from the detailed description provided. It should be understood the detailed description and specific examples, while indicating an exemplary or preferred embodiment of the invention, are intended for illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
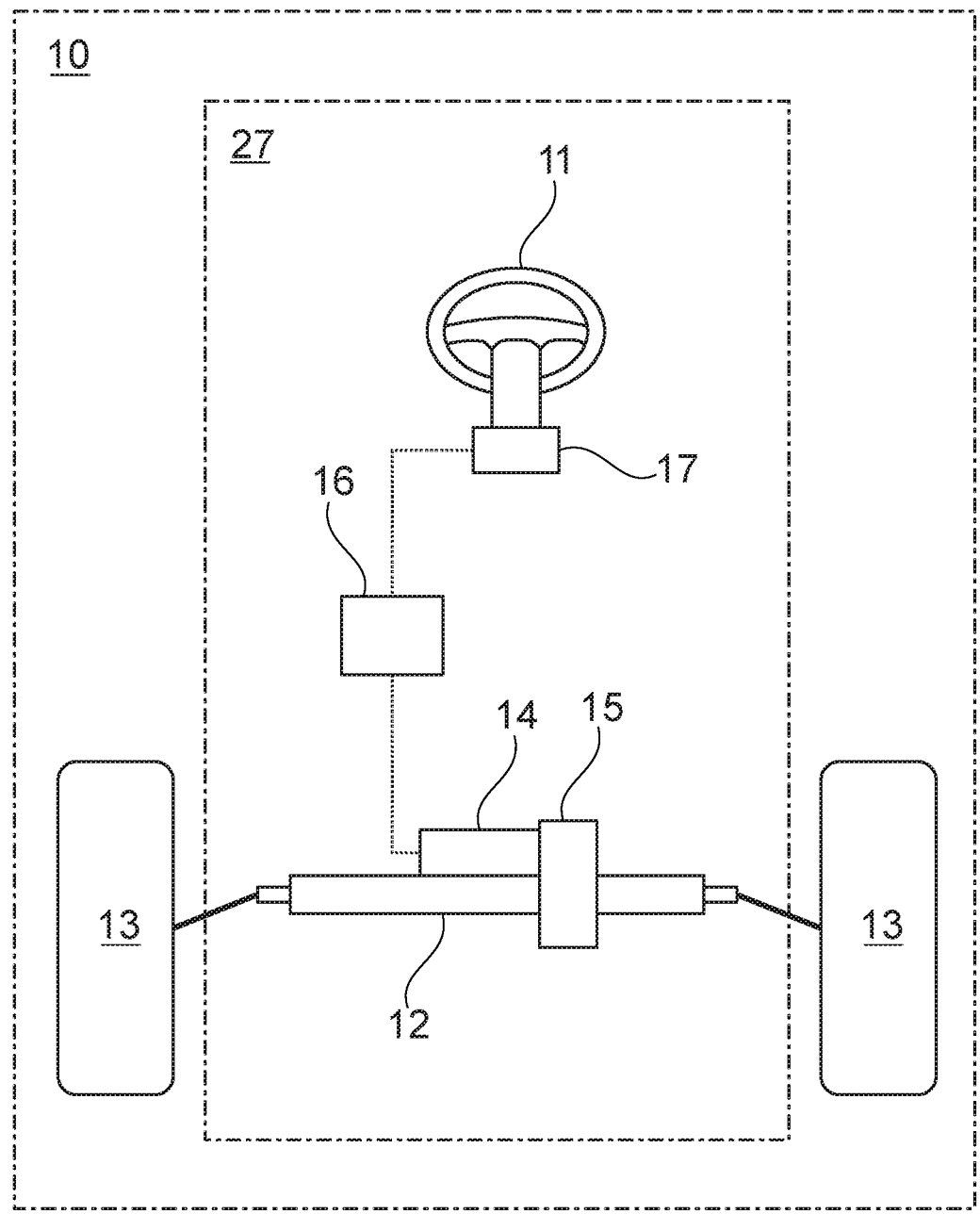
FIG. 1 is a schematic view of a motor vehicle steering system having a transmission unit.

FIG. 1 schematically illustrates a motor vehicle 10 and a motor vehicle steering system 27. The steering system 27 including a driver operated steering mechanism 11, preferably a steering wheel. The steering mechanism 11 connects to a steering mechanism base 17. The steering mechanism base 17 including a steering mechanism drive, for example, an electric motor, that applies a torque to the steering mechanism 11. The steering mechanism base may also include a sensor, configured to detect the position of the steering mechanism, for example, a steering wheel angle.

The steering system 27 including a steering gear 12, wherein the steering mechanism 11 and the steering gear 12 are mechanically separated from one another. Wheels 13 of the motor vehicle 10 are mechanically coupled to the steering gear 12. A drive unit 14, for example, an electric motor, of the steering system 27 drives the steering gear 12. A transmission unit 15 connects the drive unit 14 to the steering gear 12.

A control unit 16 controls the drive unit 14 of the steering system 27 and transmits to the drive unit 14 steering commands input through the steering mechanism 11.

The transmission unit 15 transmits to the steering gear 12 a torque generated by the drive unit 14. The transmission unit 15 includes a redundancy. The transmission unit 15 includes a first transmission path 24 and a second transmission path 25. Each of the transmission paths 24, 25 configured to transmit torque generated by the drive unit 14 to the steering gear 12. The transmission unit 15 engaging only one of the transmission paths 24, 25. In a normal state, the first transmission path 24 transmits to the steering gear 12 the torque generated by the drive unit 14, while the second transmission path 25 does not transmit torque generated by the drive unit 14 to the steering gear 12. In a backup state, the second transmission path 25 transmits torque generated by the drive unit 14 to the steering gear 12, while the first transmission path 24 does not transmit torque generated by the drive unit 14 to the steering gear. The first transmission path 24 serves as the normal transmission path, and the second transmission path 25 serves as a backup or emergency transmission path should the first transmission path 24 fail.

Figure 2:
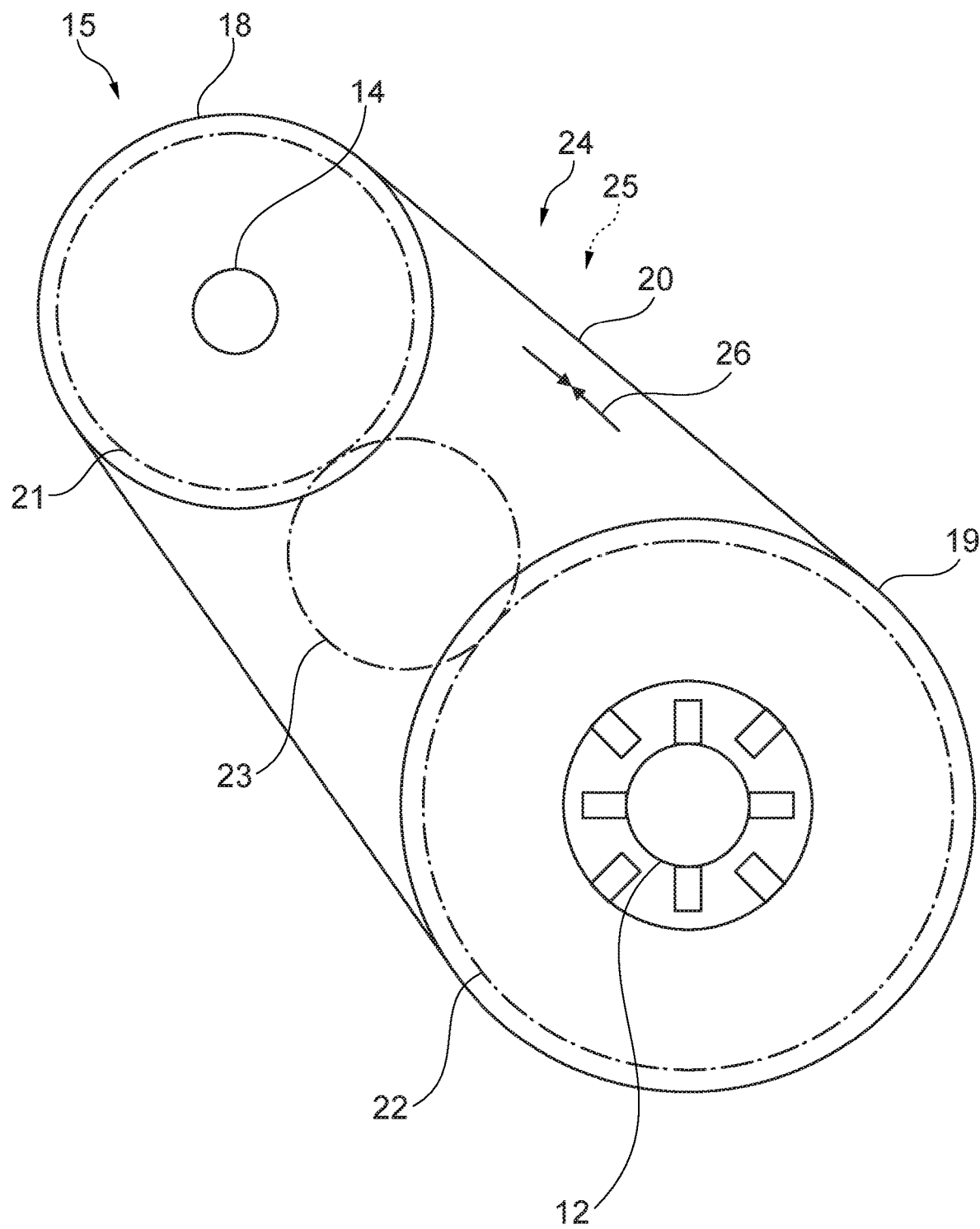
FIG. 2 is a schematic view of the transmission unit of FIG. 1.

The first transmission path 24 is a belt drive and the second transmission path 25 is a gear drive. FIG. 2 schematically illustrates the transmission unit 15 in an exemplary embodiment, wherein the elements of the second transmission path 25 are represented with a dashed line. Another embodiment includes the first transmission path 24 configured as a gear drive and the second transmission path 25 as a belt drive.

The belt drive of the first transmission path 24 includes a first wheel 18 receiving a torque generated by the drive unit 14 and a second wheel 19 delivering the torque generated by the drive unit 14 to the steering gear 12. The first wheel 18 and the second wheel 19 are belt pulleys connected, in a torque-transmitting manner, by a belt 20. The belt 20 in the normal state subjected to a predetermined or certain mechanical tension 26.

The gear drive of the second transmission path 25 lies in the same axis as the first transmission path 24 and includes a first additional wheel 21 receiving the torque generated by the drive unit 14 and a second additional wheel 22 delivering the torque generated by the drive unit 14 to the steering gear. The first additional wheel 21 and the second additional wheel 22 are, for example, gearwheels, connected in a torque-transmitting manner, via a connecting wheel 23, which may also be a gearwheel. The backup state engages when the first transmission path 24 fails. In the normal state, interruption of torque transmission in the second transmission path 25 occurs when the first additional wheel 21 and connecting wheel 23 are not engaged, the second additional wheel 22 and connecting wheel 23 are not engaged, or neither the first additional wheel 21 nor the second additional wheel 22 engages connecting wheel 23, for example, the connecting wheel 23 is displaced parallel to the steering gear 12. The torque path also interrupted when the first additional wheel 21 and drive unit 14 are not connected in a torque-transmitting manner or second additional wheel 22 and steering gear 12 are not connected in a torque-transmitting manner.

When the belt drive forms the second transmission path 25, the first additional wheel 21 receives the torque generated by the drive unit 14 and the second additional wheel 22 delivers the torque generated by the drive unit 14 to the steering gear 12. Again, the first additional wheel 21 and the second additional wheel 22 are belt pulleys connected, in the backup state, in a torque-transmitting manner, via a second belt. In the normal state, the torque transmission of the second transmission path 25 interrupted when the first additional wheel 21 and drive unit 14 are not connected in a torque-transmitting manner or the second additional wheel 22 and steering gear 12 are not connected in a torque-transmitting manner.

If a failure of the first transmission path 24 occurs the transmission unit 15 automatically engages the second transmission path 25. For example, mounting the first additional wheel 21 or the second additional wheel 22 on its associated shaft with a torsional play. A twisting motion, triggered by the failure of the first transmission path 24, creates a force closure or a forms closure between the additional wheel 21, 22 and the respective shaft.

When configuring the first transmission path 24 as a belt drive tension 26 in the belt may deactivate the second transmission path 25. In the normal state, the tension 26 in the belt 20 keeps the second transmission path 25 from engaging, and in the backup state, without the belt tension, the second transmission path 25 engages. For example, the transmission unit 15 may include a clutch which, in an open state, decouples the second transmission path 25 and in a closed state couples the second transmission path 25. As used herein, couples and decouples relates to torque transfer in or through the particular transmission path. In the normal state, the tension in the belt 20 keeps the clutch 28 in an open state, for example, if there is tension 26 in the belt 20 the clutch is kept open. In the backup state, if the first transmission path 24 fails, for example, the belt 20 fails or cannot hold tension, it does not transmit torque from the first wheel 18 to the second wheel 19. Belt failure, for example, belt breakage, that prevents the belt 20 from maintaining the requisite tension 26 causes the clutch 28 to close or engage and transfer torque from the first additional wheel 21 through the connecting wheel 23 to the second additional wheel 22. In another example, the belt tension keeps one of the additional wheels 21, 22, or the connecting wheel 23, from engaging. As long as the belt 20 does not fail, one of the additional wheels 21, 22 or the connecting wheel 23 is held a non-engagement position keeping the second transmission path 25 decoupled. Failure of the belt 20 removes the belt tension, without the belt tension one of the additional wheels 21, 22, or the connecting wheel 23 shifts from the non-engagement position into an engagement position.

The motor vehicle 10 includes a mechanism that recognizes when one of the transmission paths 24, 25 fails. For example, the motor vehicle 10 includes a sensor, for example, a torque sensor, that detects whether, via the second transmission path 25, a torque is transmitted. The motor vehicle 10 configured to issue a message upon recognizing failure of one of the transmission paths 24, 25.

In the disclosed example, the motor vehicle includes a steering mechanism 11, a steering gear 12 mechanically decoupled from the steering mechanism 11, a drive unit 14 driving the steering gear 12, and a transmission unit 15 connecting the drive unit 14 in a torque-transmitting manner to the steering gear 12. The transmission unit 15 having a redundancy improving the operating reliability of the vehicle steering without an additional drive unit. The transmission unit 15 has a first transmission path 24 and a second transmission path 25. The first and the second transmission path 24, 25 can respectively be a belt drive or a gear drive.

If a failure of the normal first transmission path occurs 24, the second transmission path 25, operating as a backup or emergency transmission path, drives the steering gear 12. The transmission unit 15 configured to automatically engage the second transmission path 25 if a failure of the first transmission path occurs 24.

One example of the transmission unit 15 includes a clutch, which in the open state decouples the second transmission path and in the closed state couples this same. The clutch kept open by tension 26 on a belt 20 of the belt drive of the first transmission path 24.

The automatic switchover from normal operation into a backup operation is realized in a simple manner.

A further example of the transmission unit 15 includes the first transmission path 24 being a belt drive and the second transmission path 25 a gear drive. The transmission unit 15 configured such that belt tension of the belt 20 of the first transmission path 24 keeps the second transmission path 25 decoupled. Loss of belt tension results in an automatic switchover from normal operation into backup operation in a simple manner.

The motor vehicle can be configured to recognize when one of the transmission paths 24, 25 fails. Because of the redundant design, the driver notices nothing of the failure of one of the transmission paths. Upon recognizing a failure, a warning message can issue informing the driver.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle comprising:
    a steering mechanism;
    a steering gear mechanically decoupled from the steering mechanism;
    a drive unit coupled to the steering gear;
    a transmission unit connecting the drive unit in a torque-transmitting manner to the steering gear wherein the transmission unit includes a first transmission path and a second transmission path;
    a clutch having an open state that decouples the second transmission path and a closed state that couples the second transmission path; and
    the first transmission path including a belt drive wherein a belt tension of a belt of the belt drive maintains the clutch in the open state.

2. The motor vehicle of claim 1 wherein the second transmission path includes a gear drive.

3. The motor vehicle of claim 1 wherein the motor vehicle including a sensor, the sensor monitoring and recognizing when one of the first and second transmission paths fails.

4. A motor vehicle steering system comprising:
    a steering gear mechanically decoupled from a steering mechanism;
    a drive unit driving the steering gear;
    a transmission unit connecting the drive unit in a torque-transmitting manner to the steering gear, the transmission unit including a first transmission path and a second transmission path;

the first transmission path includes a belt drive having a belt; and the second transmission path includes a gear drive, wherein decoupling of the second transmission path occurs when the belt of the belt drive is under tension.

5. The motor vehicle steering system of claim 4 including a sensor, the sensor monitoring and recognizing when one of the first transmission path or the second transmission path fails.

6. A motor vehicle steering system comprising:

a steering gear mechanically decoupled from a steering mechanism;

a drive unit driving the steering gear;

a transmission unit connecting the drive unit in a torque-transmitting manner to the steering gear, the transmission unit including a first transmission path and a second transmission path;

the first transmission path includes a belt drive including a belt;

the second transmission path includes a gear drive; and a clutch having an open state that decouples the second transmission path and a closed state that couples the second transmission path wherein the clutch remains in the open state decoupling the second transmission path when the belt of the belt drive is under tension.

7. The motor vehicle steering system of claim 6 including a sensor, the sensor monitoring and recognizing when one of the first transmission path or the second transmission path fails.

* * * * *